(12) United States Patent
Söllinger et al.

(10) Patent No.: US 12,145,227 B2
(45) Date of Patent: Nov. 19, 2024

(54) MULTIPLE WELDING METHOD

(71) Applicant: Fronius International GmbH, Pettenbach (AT)

(72) Inventors: Dominik Söllinger, Pettenbach (AT); Andreas Waldhör, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 638 days.

(21) Appl. No.: 17/602,338

(22) PCT Filed: Apr. 7, 2020

(86) PCT No.: PCT/EP2020/059899
§ 371 (c)(1),
(2) Date: Oct. 8, 2021

(87) PCT Pub. No.: WO2020/208020
PCT Pub. Date: Oct. 15, 2020

(65) Prior Publication Data
US 2022/0161350 A1    May 26, 2022

(30) Foreign Application Priority Data
Apr. 10, 2019 (EP) ................... 19168534

(51) Int. Cl.
*B23K 9/173* (2006.01)
*B23K 9/095* (2006.01)
(Continued)

(52) U.S. Cl.
CPC .......... *B23K 9/1735* (2013.01); *B23K 9/0953* (2013.01); *B23K 9/1012* (2013.01); *B23K 9/125* (2013.01)

(58) Field of Classification Search
CPC .. B23K 9/1735; B23K 9/0953; B23K 9/1012; B23K 9/125; B23K 9/1675
See application file for complete search history.

(56) References Cited

U.S. PATENT DOCUMENTS 2,017,509 A * 10/1935 Osborne ................ B23K 9/121
314/5
2007/0145028 A1* 6/2007 Artelsmair ........... B23K 9/1675
219/137.71
(Continued)

FOREIGN PATENT DOCUMENTS

CN     108176915 A     6/2018
EP     2830807 B1     12/2015
(Continued)

OTHER PUBLICATIONS

International Search Report issued in International Patent Application No. PCT/EP2020/059899, dated Jul. 27, 2020, along with an English translation thereof.
(Continued)

*Primary Examiner* — Brian W Jennison
(74) *Attorney, Agent, or Firm* — GREENBLUM & BERNSTEIN, P.L.C.

(57) ABSTRACT

A a multiple welding method having an improved starting process in which the control unit of the guide electrode starts welding-wire advancing of the guide electrode and sends a synchronization signal to the control unit of the trailing electrode when the guide electrode has moved a certain distance or for a certain time. The control unit of the trailing electrode starts welding-wire advancing of the trailing electrode in dependence on the received synchronization signal before the guide electrode touches the workpiece.

16 Claims, 4 Drawing Sheets

Figure 1:
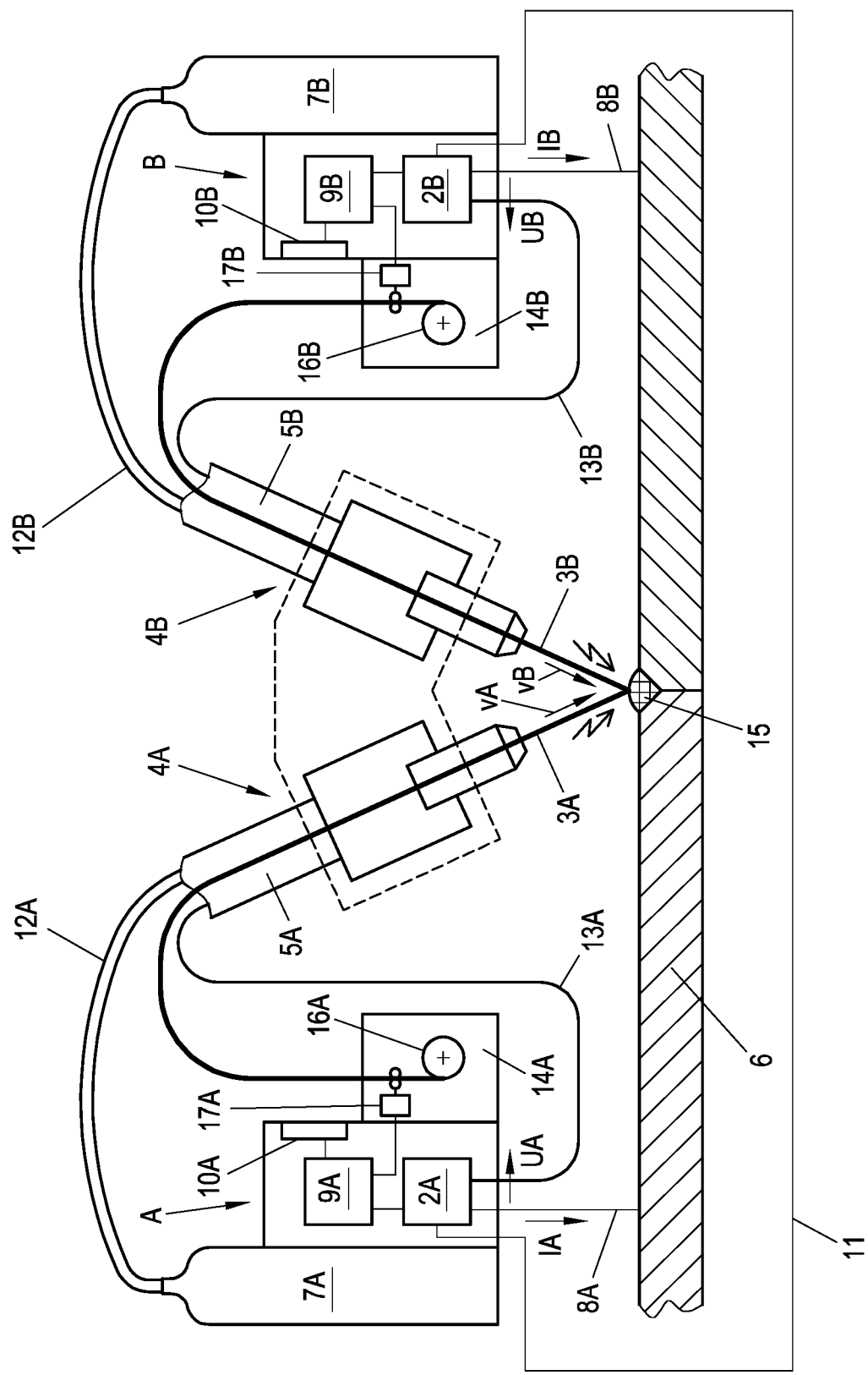

(51) Int. Cl.
*B23K 9/10* (2006.01)
*B23K 9/12* (2006.01)

(56) References Cited

U.S. PATENT DOCUMENTS

| | | | | |
|---|---|---|---|---|
| 2009/0294428 A1* | 12/2009 | Yoshima | ............... | B23K 9/067 |
| | | | | 219/137 R |
| 2015/0083699 A1* | 3/2015 | Waldhor | .............. | B23K 9/0671 |
| | | | | 219/130.4 |
| 2015/0343549 A1* | 12/2015 | Henry | ................. | B23K 9/1735 |
| | | | | 219/130.51 |

FOREIGN PATENT DOCUMENTS

| | | |
|---|---|---|
| JP | 2002-224833 A | 8/2002 |
| WO | 2005-056228 A1 | 6/2005 |

OTHER PUBLICATIONS

Written Opinion of the International Searching Authority issued in International Patent Application No. PCT/EP2020/059899, dated Jul. 27, 2020, along with an English translation thereof.

* cited by examiner

MULTIPLE WELDING METHOD

The invention relates to a method for carrying out a multiple welding method in which a welding process is carried out in each case with at least two welding wires as consumable electrodes on a workpiece, a first welding wire being provided as a guide electrode and the at least one further welding wire being provided as a trailing electrode, the welding processes of the guide electrode and the trailing electrode each being controlled by a control unit or a common control unit. The invention further relates to a welding arrangement for carrying out a multiple welding method on a workpiece using at least two welding devices.

The present invention relates to a multiple welding method having a plurality of consumable electrodes, in particular the known MIG/MAG welding. For example, a multiple pulse welding method is known in which at least two electrodes melt into a common weld pool. Separate welding devices are required for each electrode, i.e. a power source, a welding torch and a welding-wire advancing unit. A pulse welding process is implemented with each welding device, it also being possible to carry out other welding processes, for example a short arc welding process, corona arc welding process, short arc welding process with reversing welding-wire advancing, etc. Multiple pulse welding can be operated in such a way that the welding processes are started and operated independently of one another such that the welding-wire advancing speed and the pulse frequency are set separately for each welding process. However, this is more time-consuming for the welder because the welding parameters must be set accordingly in all welding devices. Apart from this, there is little or no influence on any mutual influence caused by the welding processes occurring at the same time, which can reduce the welding quality. Therefore, a multiple pulse welding method having synchronized welding processes has already become known, in which one welding device is given a pulse frequency that is followed by the other welding device. Both welding processes are thus synchronized with one another and weld at the same pulse frequency.

In the case of a multiple welding method, for example, a single welding torch having a plurality of, in particular two, electrodes can also be provided. The electrodes are then positioned at a defined fixed distance and angle relative to one another on the welding torch in order to work preferably in a common weld pool on a workpiece. The electrodes or welding wires do not necessarily have to melt into a common weld pool; it would also be conceivable for the electrodes to be spaced apart such that two separate melt pools are created. Nevertheless, the term "multiple welding process" is used. Both electrodes are moved relative to the workpiece together with the welding torch. For example, for this purpose the welding torch can be arranged on a welding robot that executes a predetermined welding movement. However, two separate welding torches could also be provided, each having at least one electrode, that are positioned relative to one another and substantially moved together. The movement can, for example, in turn be carried out by a welding robot, the two welding torches preferably not being moved relative to one another during the welding process.

As a rule, one of the at least two electrodes or welding wires of the multiple welding method is used as a guide electrode and the second electrode (or the other electrodes) are used as what are known as trailing electrodes. The electrode that is arranged in the direction of movement of the common welding torch (or the common direction of movement of the separate welding torches) is often used as a guide electrode, and the electrode arranged behind in the direction of movement is used as a trailing electrode. However, it would also be conceivable that two welding robots are provided that move two welding torches in opposite directions. The electrode of one welding torch is then used as the guide electrode, and the electrode of the other welding torch is used as the trailing electrode. The ignition of the arcs of the guide electrode and the trailing electrode has so far often taken place randomly. For example, the welding-wire advancing of both electrodes was started and the electrode that first made contact with the workpiece was ignited first. Under certain circumstances, however, this can lead to inaccurate positioning of the weld seam and/or to uncontrolled material removal, which is disadvantageous.

CN 108 176 915 A discloses a starting process of a tandem welding method having a welding torch on which two welding wires are provided. First, the advancing of the first welding wire is started. When the first welding wire touches the workpiece, a short circuit occurs and an arc is ignited. When the arc burns steadily, the advancing of the second welding wire is started and an arc is ignited when the second welding wire reaches the burning arc of the first welding wire.

JP 2002 224833A discloses a multiple welding method having a guide electrode and a trailing electrode. To start the welding process, only the advancing of the guide electrode is started until said guide electrode touches the workpiece and a short circuit occurs, whereupon an arc is ignited. A robot control unit then controls the welding torch at a welding speed in the welding direction. When a trailing electrode time has expired, the robot control unit starts the advancing of the trailing electrode.

US 2015/343549 A1 discloses a multiple welding method having two welding devices for performing a welding process on a workpiece, the welding processes being controlled by a control unit in each case. The control units of the two welding devices are connected via a synchronization control unit, which synchronizes the welding processes in terms of time, in particular a phase shift of the welding currents.

In EP 2 830 807 B it is proposed, for example, that after the determination of the guide and trailing electrodes, the wire advancing of both electrodes is started at the same time. As soon as the guide electrode makes contact with the workpiece, a short circuit is detected by the corresponding welding device and the arc is ignited immediately. A short circuit is also detected on the trailing electrode when the workpiece is touched, but in this case an arc is not ignited immediately, but the trailing electrode is brought into a ready position. Only after a certain waiting time is the trailing electrode moved from the ready position in the direction of the workpiece and the arc is ignited when it is touched. However, the method is limited to what are known as push-pull systems having very powerful wire-advancing units on the welding torch, which alternately enable highly dynamic wire advancing toward the workpiece and away from the workpiece. Only in such systems can the starting process take place in a sufficiently short time. The method is unsuitable for less dynamic welding systems, in particular what are known as push systems, which do not have a separate wire-advancing unit on the welding torch and thus allow a comparatively slow wire-advancing speed and no highly dynamic back and forth movement of the welding wire because the ignition process would take too long.

It is therefore an object of the present invention to provide a multiple welding method having an improved starting process that allows a quick and reproducible start even in the case of a design-related relatively slow wire-advancing speed.

The object is achieved according to the invention in that a starting process of the multiple welding method is carried out in that the control unit of the guide electrode starts welding-wire advancing of the guide electrode and sends a synchronization signal to the control unit of the trailing electrode when the guide electrode has moved a certain distance or for a certain time, and the control unit of the trailing electrode starts welding-wire advancing of the trailing electrode in dependence on the received synchronization signal before the guide electrode touches the workpiece.

It is advantageous that the guide electrode touches the workpiece before the trailing electrode, an arc being ignited on the guide electrode when the workpiece is touched and an arc being ignited on the trailing electrode when the trailing electrode touches the workpiece or penetrates a region surrounding the guide electrode, which region is ionized by the arc of the guide electrode. The ionization energy must be large enough to ignite the arc.

It is advantageous that when the trailing electrode touches the workpiece before the guide electrode, the control unit of the trailing electrode detects a short circuit and sends a synchronization signal to the control unit of the guide electrode, the control unit of the guide electrode stopping welding-wire advancing of the guide electrode and the control unit of the trailing electrode stopping welding-wire advancing of the trailing electrode, that the control unit of the trailing electrode moves the trailing electrode to a certain electrode distance away from the workpiece and sends a synchronization signal to the control unit of the guide electrode, that the control unit of the guide electrode starts welding-wire advancing of the guide electrode and an arc is ignited on the guide electrode when the guide electrode touches the workpiece, the control unit of the guide electrode sending a synchronization signal to the control unit of the trailing electrode when the arc is ignited, and that the control unit of the trailing electrode starts welding-wire advancing of the trailing electrode in dependence on the received synchronization signal, an arc being ignited on the trailing electrode when the trailing electrode touches the workpiece or penetrates a surrounding area that is ionized by the arc of the guide electrode. This ensures that an arc is ignited first on the guide electrode, even if the trailing electrode touches the workpiece first.

According to a further advantageous embodiment, it is provided that when the trailing electrode touches the workpiece before the guide electrode, the trailing electrode is defined as the guide electrode and the guide electrode is defined as the trailing electrode, that an arc is ignited on the guide electrode when the workpiece is touched and that an arc is ignited on the trailing electrode when the trailing electrode touches the workpiece or penetrates a surrounding region that is ionized by the arc of the guide electrode. As a result, the assignment of the guide and trailing electrodes can be exchanged in a simple manner, as a result of which the starting process is accelerated.

It is advantageous if the control unit of the guide electrode sends a synchronization signal to the control unit of the trailing electrode when the arc of the guide electrode is ignited, that the control unit of the trailing electrode stops welding-wire advancing of the trailing electrode when the synchronization signal is received and the trailing electrode is held in a waiting position for a certain waiting time and the control unit of the trailing electrode starts welding-wire advancing of the trailing electrode after expiry of the waiting time, the arc being ignited on the trailing electrode when the trailing electrode touches the workpiece or penetrates the region surrounding the guide electrode, which region is ionized by the arc of the guide electrode. As a result, a longer time can also be achieved between the ignition of the two or more electrodes.

A pulse welding process, a welding process having reversing welding-wire advancing, a corona arc welding process or a short arc welding process is preferably carried out as the welding process of the guide electrode and/or the trailing electrode. With these known welding processes, good welding results can be achieved, and a plurality of welding processes can also be combined.

The guide electrode and the trailing electrode are preferably fed to a common weld pool on the workpiece. As a result, a higher melting rate or higher material deposition can be achieved and a lower ignition energy is required to ignite the trailing electrode because the trailing electrode penetrates the surrounding region of the guide electrode, which region is ionized by the arc of the guide electrode and thus requires less energy, in particular a lower welding current, for ignition.

A common control unit is preferably provided for the control unit of the guide electrode and the control unit of the trailing electrode, which common control unit controls the welding process on the guide electrode and the welding process on the trailing electrode. In this way, for example, delays in the transmission of the synchronization signal can be reduced.

The object is also achieved by a welding arrangement in that, in order to carry out a starting process of the multiple welding method, the control unit of the guide electrode is configured to control the welding-wire advancing unit of the welding device of the guide electrode in order to start welding-wire advancing of the guide electrode and to send a synchronization signal to the control unit of the trailing electrode when the guide electrode has moved a certain distance or for a certain time, and in that the control unit of the trailing electrode is configured to control the welding-wire advancing unit of the welding device of the trailing electrode in order to start welding-wire advancing of the trailing electrode in dependence on the received o synchronization signal.

Figure 2A:
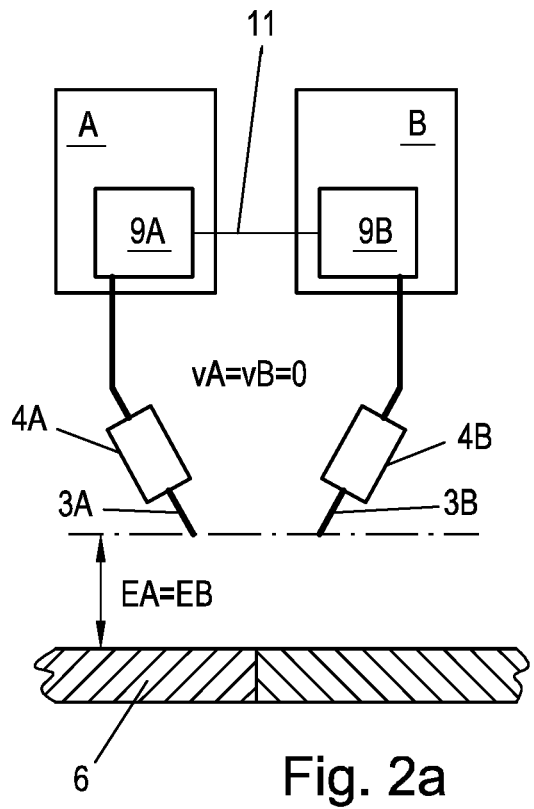
Figure 2B:
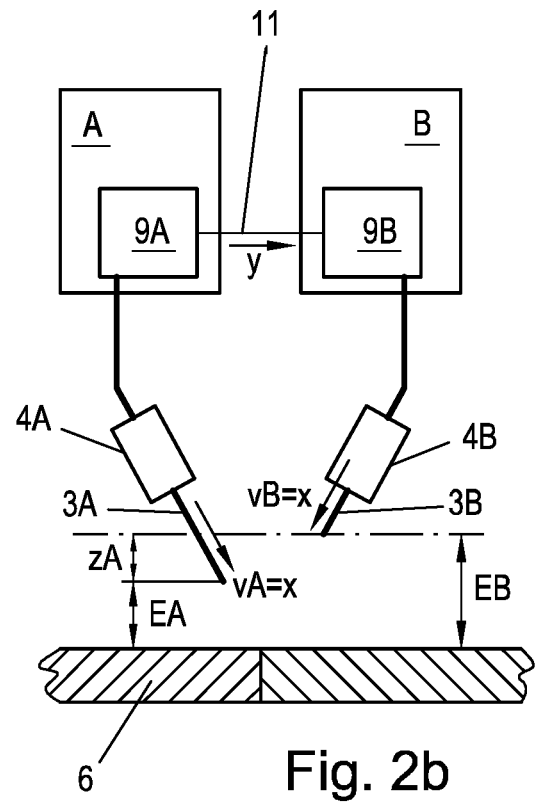
Figure 2C:
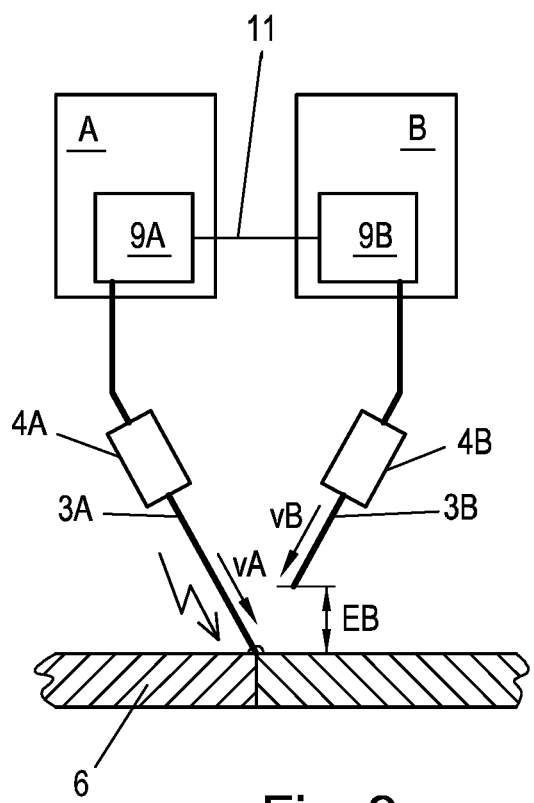
Figure 2D:
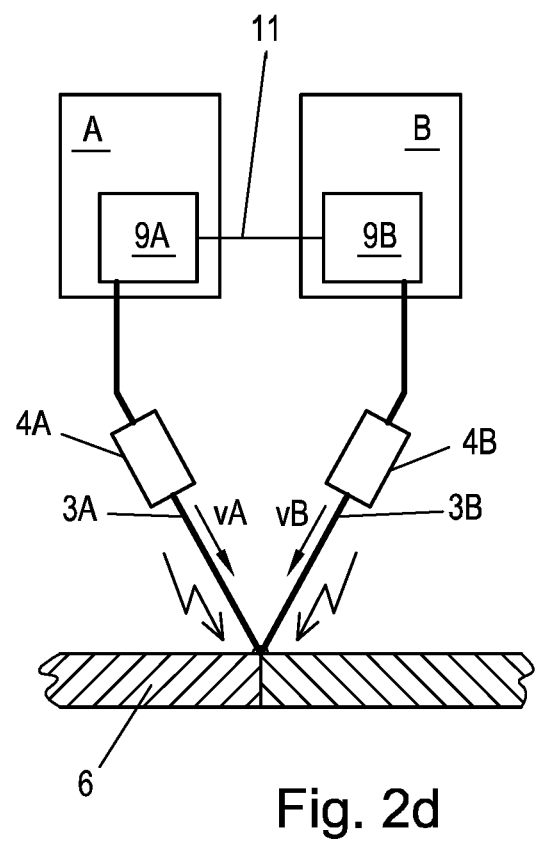
Figure 3A:
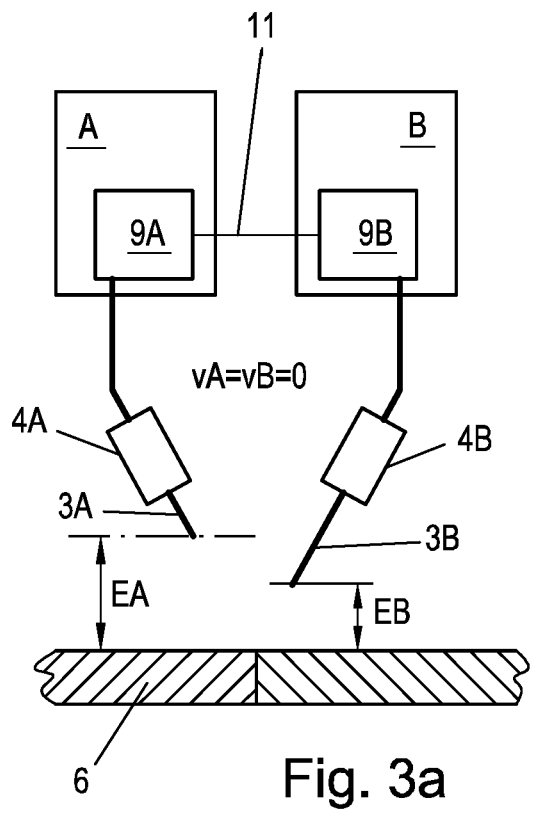
Figure 3B:
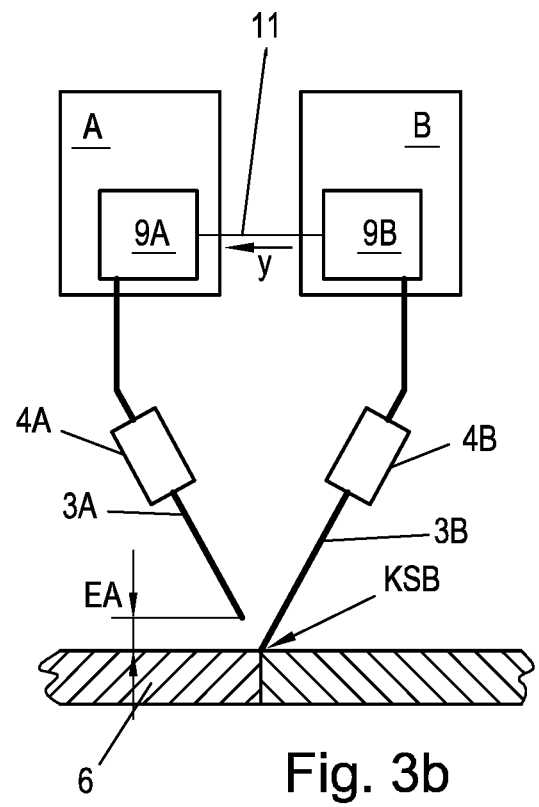
Figure 3C:
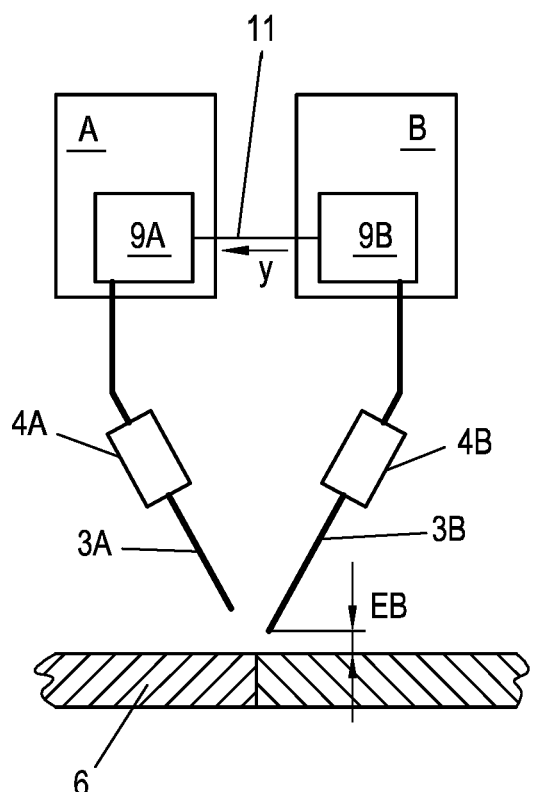
Figure 4:
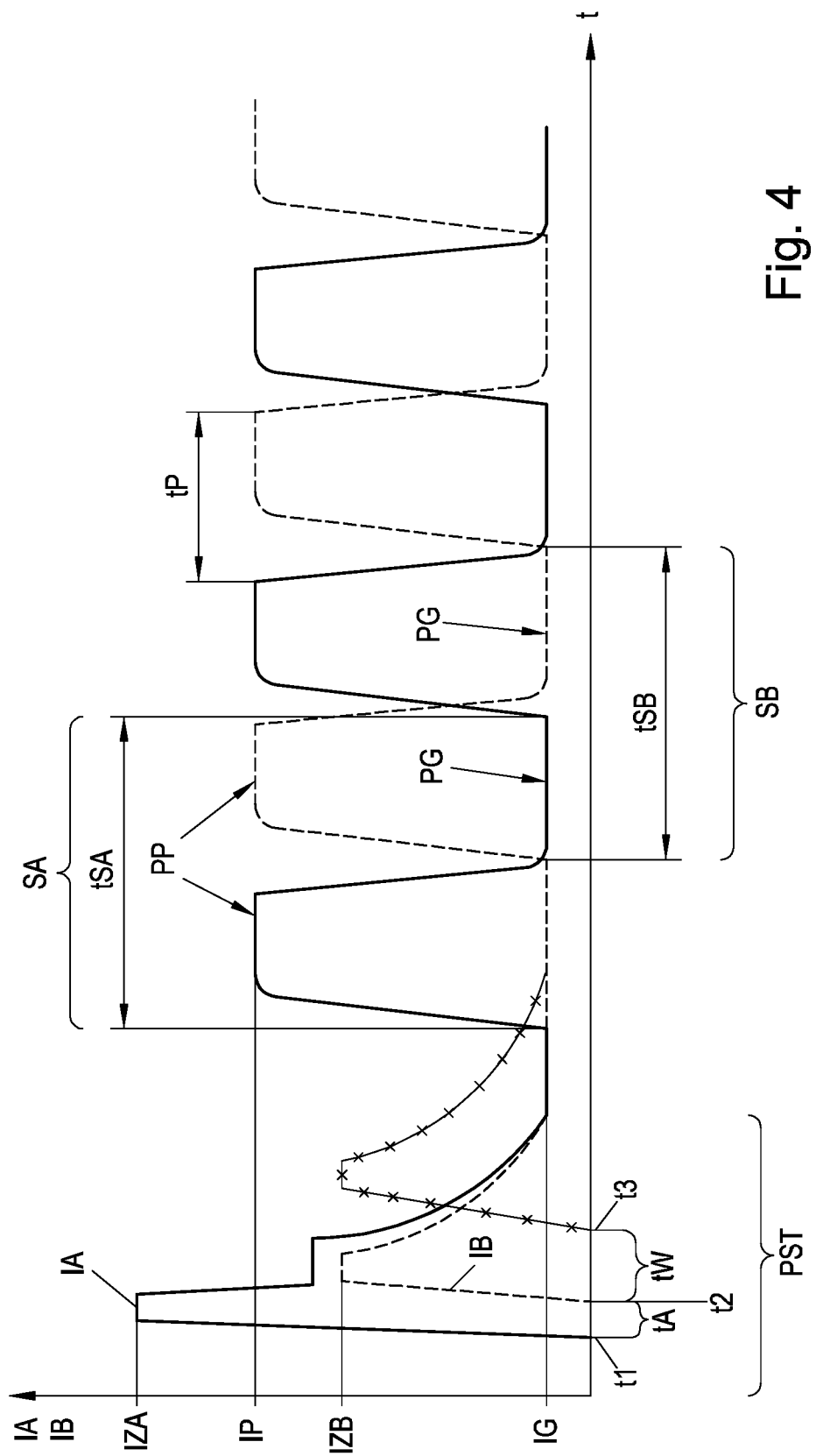

The present invention is described in greater detail below with reference to FIGS. 1 to 4, which show exemplary, schematic and non-limiting advantageous embodiments of the invention. In the drawings:

FIG. 1 is a welding arrangement having two welding devices for carrying out a multiple welding process, FIG. 2a-2d are a sequence of a starting process of a multiple welding process, FIG. 3a-3c are a further sequence of a starting process of a multiple welding process, FIG. 4 is a diagram with the progression of the welding current of the guide electrode and the welding current of the trailing electrode over time.

FIG. 1 shows a welding arrangement 1 having two mutually independent welding devices A, B in simplified form. In this case, the welding devices A, B are designed as welding devices having a consumable electrode (MIG/MAG welding). In principle, however, one or more welding devices having a non-consumable electrode (TIG welding) having automatic welding-wire advancing of a filler material could also be used. In the example shown, a welding process is carried out on a common workpiece 6 using both welding devices A, B. Of course, more than two welding devices A, B could also be provided, but the arrangement of two welding devices A, B is sufficient for understanding the invention. The welding devices A, B do not necessarily have to be designed as separate units, but it would also be conceivable that the two (or more) welding devices A, B are arranged, for example, in a common housing. However, this does not change the fact that each welding device A, B forms its own welding circuit for carrying out a welding process.

As is known, the welding devices A, B each have a welding current source 2A, 2B, a welding-wire advancing unit 14A, 14B and a welding torch 4A, 4B (MIG/MAG welding devices). The welding current sources 2A, 2B each provide the required welding voltage UA, UB, which is applied to a welding wire 3A, 3B as a consumable electrode (or to a non-consumable electrode in the case of a welding method having a non-consumable electrode such as TIG welding). The welding wire 3A, 3B is supplied to the respective welding torch 4A, 4B by means of the welding-wire advancing unit 14A, 14B at a certain welding-wire advancing speed vA, vB. The supply can take place, for example, within a hose pack 5A, 5B or also outside thereof. The welding-wire advancing unit 14A, 14B can in each case be integrated in the welding device A, B, but can also be a separate unit, as shown in FIG. 1. Within the welding-wire advancing unit 14A, 14B, for example, a wire roll 16A, 16B can be provided on which the welding wire 3A, 3B is wound. The welding wire 3A, 3B could, for example, also be arranged in a container such as a barrel and supplied from there to the welding torch 4A, 4B. Furthermore, a suitable drive unit 17A, 17B can be provided, which drive unit is controlled by the control unit 9A, 9B in order to unwind the welding wire 3A, 3B from the wire roll 16A, 16B or from the container and supply said welding wire to the welding torch 4A, 4B at a welding-wire advancing speed vA, vB.

To carry out a welding process, an arc is ignited between the welding wire 3A, 3B and the workpiece 6, as is symbolized here by the lightning bolts. On the one hand, the material of the workpiece 6 is locally melted by the arc and a weld pool 15 is generated. On the other hand, the welding wire 3A, 3B is supplied to the weld pool 15 by means of a certain welding-wire advancing speed vA, vB and melted by the arc in order to apply material of the auxiliary welding material (here the welding wires 3A, 3B as consumable electrodes) to the workpiece 6. When the welding torch 4A, 4B moves relative to the workpiece 6, a weld seam can thereby be formed (in FIG. 1 in the direction normal to the plane of the drawing).

In the respective hose pack 5A, 5B, further lines can optionally also be provided between the welding device A, B and the respective welding torch 4A, 4B (for example a control line (not shown) or a coolant line). A shielding gas is often also used in order to shield the weld pool 15 from the ambient air, in particular the oxygen contained therein, in order to avoid oxidation. As a rule, inert gases (e.g. argon), active gases (e.g. CO2) or mixtures thereof are used, which can also be supplied to the welding torch 4A, 4B via the hose pack 5A, 5B by means of suitable shielding gas lines 12A, 12B. The shielding gases are usually stored in separate (pressure) containers 7A, 7B, which can be supplied to the welding devices A, B (or directly to the welding torch 4A, 4B) via suitable lines, for example. If the same shielding gas is used, a common container for both (all) welding devices A, B could also be provided. Of course, welding can also be carried out without shielding gas if necessary. The hose pack 5A, 5B can be coupled to the welding torch 4A, 4B and to the welding device A, B, for example via suitable couplings.

In order to in each case form a welding circuit of the welding devices A, B, the welding current sources 2A, 2B are in each case connected to the workpiece 6 by a ground line 8A, 8B. One pole of the welding current source 2A, 2B, usually the negative pole, is connected to the ground line 8A, 8B. The other pole of the welding current source 2A, 2B, usually the positive pole, is connected to the welding electrode 4A, 4B (or vice versa) via a suitable current line 13A, 13B. A welding circuit is thus formed for each welding process via the arc and the workpiece 6.

A control unit 9A, 9B is also provided in each of the welding devices A, B, which control unit controls and monitors the respective welding process, including the respective welding-wire advancing. For this purpose, the welding parameters required for the welding process, such as the welding-wire advancing speed vA, vB, the welding current IA, IB, the welding voltage UA, UB, the pulse frequency, the pulse current duration, etc. are predefined or adjustable in the control unit 9A, 9B. To control the welding process, the control unit 9A, 9B is connected to the welding current source 2A, 2B and the welding-wire advancing unit 14A, 14B (for example in particular the drive unit 17A, 17B). A user interface 10A, 10B connected to the control unit 9A, 9B can also be provided for entering or displaying certain welding parameters or a welding status. Furthermore, a suitable interface (not shown) could also be provided on the welding device A, B, via which interface the welding device A, B can be connected to an external control unit via which the welding device A, B is controlled. For example, a central control unit (not shown) could be provided that is connected to both welding devices A, B (or a plurality of welding devices) and via which the welding processes of the welding devices A, B can be controlled. The welding devices A, B described are of course well known, which is why they will not be discussed in more detail at this point.

The two welding torches 4A, 4B can also be arranged locally relative to one another in such a way that these welding wires 3A, 3B work in two separate weld pools instead of in a common weld pool 15 on the workpiece 6, as shown in FIG. 1. This arrangement with respect to one another can be fixed, for example in that both welding torches 4A, 4B are arranged on a welding robot (not shown) that guides both welding torches 4A, 4B. The arrangement can, however, also be variable, for example in that one welding torch 4A, 4B each is guided by a welding robot. Instead of a welding robot, another suitable manipulation device can of course also be provided, for example a type of gantry crane, which preferably enables movement in a plurality of, preferably three axes. However, a common welding torch could also be provided for both welding wires 3A, 3B, as indicated by dashed lines in FIG. 1. It is irrelevant whether the welding torches 4A, 4B are used for joint welding or build-up welding or some other welding method. Manual welding would of course also be possible.

The welding devices A, B are connected by means of a communication connection 11 via which synchronization information Y can be exchanged bidirectionally between the welding devices A, B. The communication connection 11 can be, for example, a wired or wireless connection between the control units 9A, 9B or between the user interfaces 10A, 10B. In a multiple welding method, one electrode is usually provided as a guide electrode and the other electrode(s) is/are provided as what are known as trailing electrodes. Often the electrode that is arranged at the front in the welding direction, i.e. in the direction of movement of the welding torch (or the common welding torch) is chosen as the guide electrode and the electrode arranged behind it in the welding direction as the trailing electrode. The selection of the guide electrode and the trailing electrode can for example be set manually by a user before the start of the multiple welding method, for example via the user interfaces 10A, 10B or a common user interface, but can also be fixed. If, for example, a welding robot is provided for a welding device A, B, the respective welding device A, B can be connected to the control unit of the welding robot via a suitable interface. The operation of the welding device A, B and also the selection of the guide electrode and the trailing electrode can then take place, for example, via a user interface of the welding robot. A change in the assignment of the guide electrode and the trailing electrode during welding is also not ruled out and could, for example, take place automatically, for example when the direction of the welding movement of a welding torch 4A, 4B changes. An automatic assignment of the guide electrode and the trailing electrode would also be possible. For example, the welding devices A, B and/or the welding robots that move the welding torches 4A, 4B could communicate with one another via a suitable communication connection and be connected to a central control unit. The definition of the guide electrode and trailing electrode could be done independently, for example, as a function of a program implemented in a central control unit, for example as a function of certain parameters, such as the positions of the welding torches 4A, 4B, etc. In the example shown, the welding wire 3A (as the consumable electrode) is defined as the guide electrode and the welding wire 3B (as the consumable electrode) is defined as the trailing electrode. Of course, this would also be possible the other way around. For example, the guide electrode could be automatically defined by the control unit 9A, 9B of a welding device A, B, which control unit first loaded a selected or preset welding program, defining the welding wire 3A, 3B of the respective welding device A, B as the guide electrode. The corresponding control unit 9A, 9B can then send a synchronization signal Y to the control unit 9A, 9B of the respective other welding device A, B, and said control unit defines the corresponding welding wire 3A, 3B as a trailing electrode.

In order to ensure a defined starting process of the multiple welding method that is as consistently reproducible as possible, it is provided that the control unit of the guide electrode (in this case the control unit 9A) starts welding-wire advancing of the guide electrode and sends a synchronization signal Y to the control unit of the trailing electrode (in this case control unit 9B) when the guide electrode has moved a certain distance zA or for a certain time tA, and that the control unit 9B of the trailing electrode starts welding-wire advancing of the trailing electrode in dependence on the received synchronization signal Y, as will be explained in more detail below with reference to FIG. 2a-2d and 3a-3d.

An exemplary sequence of the starting process of the multiple welding method is shown in FIG. 2a-2d. The welding arrangement 1 corresponds substantially to the one in FIG. 1, but is shown schematically in a simplified manner. FIG. 2a shows the welding arrangement 1 in an initial position in which the welding wires 3A, 3B are preferably at an equally large electrode distance EA=EB from the workpiece 6 and have a welding-wire advancing speed vA=vB=0. For example, the same electrode distance EA=EB can be achieved by manually adjusting the welding wires 3A, 3B to the same length using a suitable tool. However, for example, a certain predefined or adjustable initial electrode distance EA, EB could also be set automatically by the control units 9A, 9B. However, this is not absolutely necessary; rather, different electrode distances EA≠EB could also be provided, as will be explained in more detail below with reference to FIG. 3a-3d. Preferably, however, the welding-wire advancing units 14A, 14B are controlled in such a way that the welding wires 3A, 3B have the same length at the end of each multiple welding process (for example at the end of a weld seam).

In the starting position shown in FIG. 2a, the welding-wire advancing of the guide electrode, in this case the welding wire 3A, is now started first. For this purpose, the welding-wire advancing unit 14A (not shown) is activated by the control unit 9A in order to move the welding wire 3A in the direction of the workpiece 6 at a certain predetermined or adjustable welding-wire advancing speed vA. The trailing electrode, in this case the welding wire 3B, stands still, i.e. with the welding-wire advancing unit vB=0. After the guide electrode or the welding wire 3A has moved a certain predetermined or adjustable distance zA or time tA, the control unit 9A of the welding device A of the guide electrode transmits a synchronization signal Y via the data communication connection 11 to the control unit 9B of the welding device B of the trailing electrode, as shown in FIG. 2b. The control unit 9B processes the received synchronization signal Y and starts welding-wire advancing of the trailing electrode, in this case the welding wire 3B, in dependence on the synchronization signal Y with a certain predetermined or adjustable welding-wire advancing speed vB. In a simple embodiment of the data communication connection 11, the synchronization signal Y can be, for example, a synchronization pulse in the form of a current or voltage pulse. If the data communication connection 11 is designed as a data bus, the synchronization signal Y can, for example, also be a corresponding bus message.

For example, the control unit 9B can start welding-wire advancing of the welding wire 3B immediately upon receipt of the synchronization signal Y (without the welding-wire advancing of the guide electrode, that is to say of the welding wire 3A, being interrupted). For example, the welding wire 3B could be moved at a welding-wire advancing speed vB=vA in the direction of the workpiece 6 or else at a welding-wire advancing speed vB≠vA different from that of the guide electrode. The distance zA can be determined, for example, by the control unit 9A based on the welding-wire advancing speed vA and the time tA. Of course, however, a separate measuring device, for example a suitable sensor, could also be provided in order to detect a certain distance zA covered.

As shown in FIG. 2b, the guide electrode, in this case the welding wire 3A, is, at the time when the synchronization signal Y is sent to the control unit 9B, at an electrode distance EA from the workpiece 6, which electrode distance is smaller than the electrode distance EB of the trailing electrode, in this case the welding wire 3B (EA<EB). If the welding-wire advancing of the trailing electrode or welding wire 3B is started immediately upon receipt of the synchronization signal Y, both welding wires 3A, 3B are now moved simultaneously in the direction of the workpiece 6, preferably at the same welding-wire advancing speed vB=vA, as indicated in FIG. 2b. The welding wire 3A or the guide electrode is thus substantially ahead of the welding wire 3B or the trailing electrode with a time lead of tA or the lead of the distance zA.

As shown in FIG. 2c, the welding wire 3A contacts the workpiece 6 first, i.e. before the welding wire 3B, the electrode distance EB of the trailing electrode or welding wire 3B corresponding to the distance zA (shown in FIG. 2b) covered by the guide electrode (at equal welding-wire advancing speeds vA=vB). When the welding wire 3A comes into contact with the workpiece 6, an arc is ignited between the welding wire 3A and the workpiece 6, as indicated by the lightning bolt. For example, the control unit 9A detects a short circuit in the welding circuit of the welding device A due to an abrupt increase in the welding current IA (start phase PST in FIG. 4), whereupon the control unit 9A sets, in particular controls, the welding parameters of the corresponding welding process to be carried out after the start phase PST. In the case of a pulse welding process, these are, for example, periodic welding cycles having a certain basic current IG, pulse current IP, welding voltage U, pulse frequency f, welding-wire advancing speed v, etc., as shown in FIG. 4. After the arc has been ignited on the guide electrode or the welding wire 3A, the welding wire 3A can, under certain circumstances, also be fed to the weld pool 15 at a different welding-wire advancing speed vA than before the ignition of the arc. In particular, the welding-wire advancing speed vA before ignition could, for example, be lower than during the welding process. For example, the welding-wire advancing speed vA can be within a range of 0.5 m/min before the ignition of the arc and within a range of 20 m/min after the ignition.

While the arc is ignited at the guide electrode and the correspondingly predefined or adjustable welding process is already being carried out, the trailing electrode, in this case the welding wire 3B in the example shown, continues to be fed substantially continuously to the workpiece 6 at the welding-wire advancing speed vB, which in turn can be equal to or different from the welding-wire advancing speed vA. At the point in time in FIG. 2d, the trailing electrode 3B reaches the workpiece 6 and an arc is likewise ignited, as is indicated by the second lightning bolt. Subsequently, the control unit 9B of the welding device B also sets the welding parameters of the set welding process. Two separate welding processes are now carried out in parallel using the two welding devices A, B.

In the example shown, the two welding torches 4A, 4B are arranged relative to one another in such a way that the welding wires 3A, 3B are fed to a common weld pool 15. The arc on the welding wire 3B can thereby be ignited before the workpiece 6 is touched when the welding wire 3B reaches the arc that is already burning between the welding wire 3A and the workpiece 6. In particular, the effect that the air surrounding the arc is ionized by the arc of the guide electrode can be utilized, whereby the necessary ignition energy of the welding device B for igniting the arc on the welding wire 3B can be reduced. The welding torches 4A, 4B can, however, also be arranged relative to one another in such a way that two separate weld pools result on the workpiece 6. The arc between the trailing electrode or the welding wire 3B and the workpiece 6 is then preferably ignited when the welding wire 3B touches the workpiece 6, i.e. substantially in a conventional manner, i.e. analogously to the guide electrode.

According to a further advantageous embodiment of the method, after the synchronization signal Y has been received, the welding-wire advancing of the trailing electrode or welding wire 3B does not take place continuously or uninterruptedly until contact of the welding wire 3B with the arc of the guide electrode or with the workpiece 6. In this case, when an arc is ignited on the guide electrode, the control unit 9A sends a synchronization signal Y to the control unit 9B and the welding-wire advancing of the trailing electrode is stopped by the control unit 9B.

Thereafter, the trailing electrode, or in this case the welding wire 3B, is held in a waiting position for a certain predefined or adjustable waiting time tW. After the waiting time tW has elapsed, the control unit 9B starts the welding-wire advancing of the trailing electrode again and, by applying a welding current IB, an arc is ignited on the trailing electrode when the trailing electrode touches the workpiece 6 or penetrates the surrounding region ionized by the arc of the guide electrode. As a result, the arc on the trailing electrode 3d can be ignited any time later than on the guide electrode, in particular regardless of the distance zA covered or the time to by which the guide electrode is ahead of the trailing electrode. The waiting time tW could, for example, be set on the user interface 10B or could also be specified as a function of a welding process that has been carried out. If, as already mentioned, a welding robot is provided, for example, that is connected to the welding device A, B via a suitable interface, the waiting time tW could, for example, also be specified via the user interface of the welding robot. Of course, the control could also take place via another external control unit that is connected to the welding device A, B. For example, a central control unit could be provided that controls a plurality of welding robots and a plurality of welding devices.

If, for example, a further electrode (not shown), for example a second trailing electrode, is provided, the synchronization signal Y is of course preferably also transmitted from the control unit 9A of the welding device A of the guide electrode to the control unit 9N of the further welding device N. The second trailing electrode can then, for example, be controlled analogously to the first trailing electrode (in this case welding wire 3B). As a result, the arcs of the first and second trailing electrodes could, for example, be ignited substantially at the same time and the welding processes could be started at the same time. However, a further synchronization signal Y could, for example, also be sent from the control unit 9B of the welding device B to the control unit 9N of the further welding device N, and the welding-wire advancing of the second trailing electrode (welding wire 3N) could in turn only be started in dependence on the synchronization signal Y received from the welding device B of the first trailing electrode. As a result, the three welding processes would be started one after the other at certain time intervals. Of course, a waiting time tW could also be provided for the second trailing electrode, by which the second trailing electrode is held in a waiting position after the ignition of the arc on the first trailing electrode. The welding torches 4A, 4B, . . . 4N are preferably not moved relative to one another during the starting process and advantageously also not (or only very slowly) relative to the workpiece 6 in order to ensure controlled and reproducible application of material.

In FIG. 3a-3d a further variant of the starting process of the multiple welding method is shown. In FIG. 3a, the welding arrangement 1 is again shown in the starting position at the beginning of the welding method. In contrast to FIG. 2a above, the guide electrode (welding wires 3A) and trailing electrode 3B (welding wire 3B) have different electrode distances EA, EB. In particular, the trailing electrode is located closer to the workpiece 6, that is to say it has a smaller electrode distance EB (EB<EA). The starting process now takes place in a substantially unchanged manner as before, in that the control unit 9A starts the welding-wire advancing of the guide electrode. After a certain time to has elapsed or a certain distance zA has been covered, the synchronization signal Y is sent from the control unit 9A to the control unit 9B of the second welding device B as before. Under certain circumstances, despite the earlier start of the welding-wire advancing of the guide electrode, the trailing electrode may come into contact with the workpiece first, i.e.

before the guide electrode. This is particularly the case when the difference between the electrode distances EA, EB in the starting position is greater than the set or predefined distance zA by which the guide electrode is ahead of the trailing electrode.

At the point in time shown in FIG. 3b, the difference between the electrode distances EA, EB has decreased due to the leading guide electrode, but the trailing electrode still touches the workpiece 6 before the guide electrode. Because this is generally undesirable, no arc is ignited on the trailing electrode or the welding wire 3B in this case. When the welding wire 3B is touched, the control unit 9B detects a short circuit in the welding circuit of the welding device B, stops the welding-wire advancing of the welding wire 3B and sends a synchronization signal Y to the control unit 9A. Upon receipt of the synchronization signal Y, the control unit 9A substantially immediately stops the welding-wire advancing of the guide electrode or of the welding wire 3A.

Figure 3D:
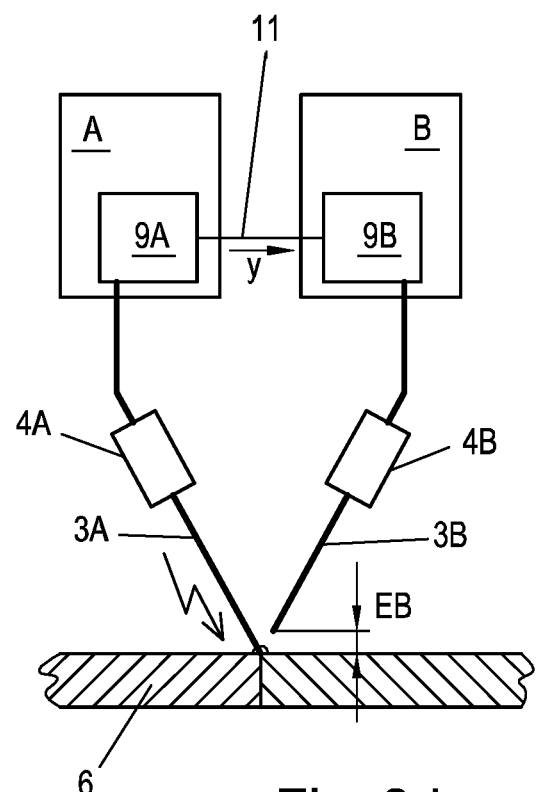

In this way, the welding-wire advancing of the guide electrode and the trailing electrode are stopped substantially at the same time. The welding-wire advancing unit 14B of the trailing electrode is then controlled by the control unit 9B in such a way that the welding wire 3B is moved away from the workpiece 6 to a certain predetermined or adjustable electrode distance EB, for example to a predetermined initial electrode distance EB of, for example, 0.1-1 mm, as shown in FIG. 3c. When this electrode distance EB is reached, the control unit 9B of the trailing electrode sends a synchronization signal Y to the control unit 9A of the guide electrode. When the synchronization signal Y is received, the control unit 9A starts the welding-wire advancing of the guide electrode or welding wire 3A and ignites an arc when the guide electrode touches the workpiece 6, as shown in FIG. 3d by the lightning bolt. When the arc is ignited, the control unit 9A of the guide electrode in turn sends a synchronization signal Y to the control unit 9B of the trailing electrode. Depending on the set electrode distance EB, the control unit 9B of the trailing electrode can ignite an arc directly on the trailing electrode, or the trailing electrode or the welding wire 3B is first moved in the direction of the workpiece 6 and the arc is ignited when the workpiece 6 is touched (or when the welding wire 3B penetrates the region surrounding the guide electrode, which region is ionized by the arc of the guide electrode). Of course, a waiting time tW could also be provided again and, when the synchronization signal Y is received, the trailing electrode could ignite the arc and/or start the welding-wire advancing only after the waiting time tW has elapsed.

Alternatively, the advantageous starting position according to FIG. 2a could also be established by stopping the welding-wire advancing of both welding wires 3A, 3B and manually cutting the welding wires 3A, 3B to the same length after the workpiece is touched and the short circuit KS is detected on the trailing electrode (FIG. 3b) length without an automatic return movement of the trailing electrode being carried out by the control unit 9B. The starting process can then be carried out again, as described with reference to FIG. 2a-2d.

According to a further embodiment of the method, it is provided that if the trailing electrode (in this case the welding wire 3B) touches the workpiece 6 before the guide electrode (welding wire 3A), analogous to FIG. 3b), the trailing electrode or the welding wire 3B is defined as the guide electrode and the guide electrode or the welding wire 3A is defined as the trailing electrode. The assignment of the guide electrode and the trailing electrode to the welding wires 3A, 3B is thus substantially interchanged. An arc is then ignited on the guide electrode (now welding wire 3B) as soon as the welding wire 3B touches the workpiece 6. The trailing electrode (now welding wire 3A) is meanwhile moved in the direction of the workpiece 6 and an arc is ignited on the trailing electrode when the trailing electrode (the welding wire 3A) touches the workpiece 6 or penetrates the surrounding region ionized by the arc of the guide electrode (welding wire 3B). As a result, the starting process of the multiple welding method can be accelerated, which is advantageous, for example, in applications in which the assignment of the guide electrode and the trailing electrode is not critical. The mode of the starting process for the case when the trailing electrode first touches the workpiece 6 can preferably be selected via the user interfaces 10A, 10B on the welding devices A, B or via a central control unit. The corresponding mode can of course also be preset.

FIG. 4 shows curves of the welding current IA of the guide electrode and of the welding current IB of the trailing electrode in a diagram over time t. In this example, a pulse welding process is carried out using both welding devices A, B, but of course other known welding processes could also be carried out, for example a short arc welding process, corona arc welding process, welding process having reversing welding-wire advancing (what is known as a cold metal transfer welding process), etc. It is also conceivable to combine different welding processes, for example to carry out a pulse welding process with the guide electrode and a spray arc welding process with the trailing electrode. The various welding processes are known to a person skilled in the art. The solid line represents the course of the welding current IA of the guide electrode (welding device A), the dashed line (and the line provided with markers) the course of the welding current IB of the trailing electrode (welding device B).

During the pulse welding shown as an example, a basic current IG and a pulse current IP, which is higher than the basic current IG, alternate periodically at a predetermined pulse frequency f. The pulse frequency f results as the reciprocal of the period tSA, tSB of a welding cycle SA, SB consisting of a pulse current phase PP having the pulse current IP and a basic current phase PG having the basic current IG. Preferably, a single welding droplet is released into the weld pool 15 during each pulse current phase PP. The pulse frequency f and/or the value of the basic current IG or pulse current IP can also change during a weld. The time courses of the welding currents IG, IP are of course idealized and shown in a simplified manner in FIG. 4. Short intermediate current pulses (not shown) are often provided in the basic current phase PG in order to increase the process stability. However, this does not change the period tSA, tSB of a welding cycle SA, SB and the resulting pulse frequency fA, fB.

Depending on the wire diameter and electrode material, the welding-wire advancing speed vA, vB, the welding currents IA, IB, the basic and pulse current durations and the pulse frequency fA, fB of the respective pulse welding process are preferably coordinated in such a way that a single drop is generated and detached with each current pulse. Welding-wire advancing speed vA, vB and pulse frequency fA, fB are generally dependent on one another. For the sake of simplicity, the curves of the welding currents IA, IB are shown substantially identically in FIG. 4, with equal base currents IGA=IGB and pulse currents IPA=IPB and only shifted in time by a certain phase shift tP. The courses could of course also differ; in particular, different pulse frequencies fA, fB, different high welding currents IA, IB or pulse durations can be provided. A different phase shift tP, and of course also no phase shift tP, can of course also be provided.

If instead of two independent welding processes having separate weld pools, for example, a multiple pulse welding process is used in which both welding wires 3a, 3b work in a common weld pool 15 (as shown in FIG. 1), the two pulse welding processes are advantageously synchronized with one another. The pulse frequencies $fA=1/tSA$, $fB=1/tSB$ of the two pulse welding processes are then preferably in a specific predetermined relationship to one another and the resulting welding cycles SA, SB have a specific predetermined phase relationship to one another. The pulse frequencies fA, fB are preferably in an integer ratio to one another.

The multiple welding process is started in a start phase PST, as has already been described in detail with reference to FIG. 2a-2d, which is why it will not be discussed in greater detail here. At time t1, the guide electrode, in this case the welding wire 3A, touches the workpiece 6 (see FIG. 2c). When the arc is ignited, the welding current IA rises rapidly to an ignition current IZA and the welding process, in this case the pulse welding process, is started in a known manner by the control unit 9A setting the welding parameters of the pulse welding process after the start phase PST, in particular adjusting it (welding current IA, welding voltage UA, welding-wire advancing speed vA, pulse frequency fA, etc.). For this purpose, the control unit 9A can optionally record one or more measured variables of the welding process as actual values, for example the welding voltage UA, the welding current IA, a welding resistance, etc. The ignition of the arc is supported by the ignition current IZA, which is higher than the base current IG and pulse current IP, in order to stabilize the arc to a certain arc length. In the event of poor or inadequate ignition of the arc on the guide electrode, it is preferable for no release for ignition to be given to the trailing electrode. For this purpose, for example, a corresponding synchronization signal Y can be sent from the control unit 9A of the guide electrode to the control unit 9B of the trailing electrode.

Because the guide electrode is ahead of the trailing electrode by the distance zA or the time tA, the trailing electrode, in this case the welding wire 3B, penetrates an ionized surrounding region surrounding the arc of the guide electrode at the time t2 with a delay of time zA. In this case, the control unit 9B does not have to detect a short circuit; instead, the ignition of the arc on the trailing electrode is started substantially automatically when the welding device B is at a no-load welding voltage. After the arc has been ignited, the specified welding process can be carried out, in this case a pulse welding process analogous to the one for the guide electrode. The welding parameters of the pulse welding process of the trailing electrode (welding current IB, welding voltage UB, welding-wire advancing speed vB, pulse frequency fB, etc.) are consequently set or in particular adjusted by the control unit 9B, as shown by the dashed line in FIG. 4. Because the air surrounding the arc of the guide electrode is ionized by the energy of the arc, a lower ignition energy is required to ignite the trailing electrode, as can be seen from the lower ignition current IZB. If the guide electrode and the trailing electrode are not supplied to a common weld pool 15, but rather to their own weld pool (not shown), the ignition on the trailing electrode preferably takes place when the workpiece is touched, substantially conventionally, analogously to the guide electrode, for example after a short circuit is detected in the welding circuit of the welding device B.

As already described, however, a certain predefined or adjustable waiting time tW could also be provided, during which the trailing electrode is held in a waiting position by the control unit 9B. In the example shown, this is indicated by a line with the markers in the start phase PST. This means that after the ignition of the arc on the guide electrode at time t1, the trailing electrode is not moved substantially continuously and uninterrupted in the direction of the workpiece 6 as before. In this case, the control unit 9A of the guide electrode sends a synchronization signal Y to the control unit 9B of the trailing electrode when the arc is ignited on the guide electrode, whereupon the control unit 9B stops the welding-wire advancing of the trailing electrode. After the predefined or adjustable waiting time tW has elapsed, the control unit 9B continues the welding-wire advancing of the trailing electrode. The trailing electrode touches the ionized air surrounding the arc of the guide electrode (or the workpiece 6), whereupon an arc is ignited at the trailing electrode and the corresponding welding process is carried out. The total time between the ignition of the arc on the guide electrode (welding wire 3A) and the ignition of the arc on the trailing electrode (welding wire 3B) is thus made up of the time to (by which the guide electrode is ahead of the trailing electrode) and the waiting time tW, as shown in FIG. 4. This allows the starting process to be made more flexible. This is particularly advantageous if there is a plurality of trailing electrodes because the start of the ignition of the arc of the respective trailing electrode can be set individually, for example. In principle, however, earlier ignition of the arc on the trailing electrode would also be possible, for example substantially at the same time or shortly after the ignition of the guide electrode (time t1 in FIG. 4), provided that the ionization energy of the guide electrode is sufficient. However, this would lead to a relatively long arc length on the trailing electrode, which may be undesirable.

The invention claimed is:

1. A method for carrying out a multiple welding process in which a welding process is carried out in each case with at least two welding wires as consumable electrodes on a workpiece, a first welding wire being provided as a guide electrode and the at least one other welding wire being provided as a trailing electrode, the welding processes of the guide electrode and the trailing electrode each being controlled by a control unit, wherein a starting process of the multiple welding method is carried out in that the control unit of the guide electrode starts welding-wire advancing of the guide electrode and sends a synchronization signal to the control unit of the trailing electrode when the guide electrode has moved a certain distance or for a certain time and in that the control unit of the trailing electrode starts welding-wire advancing of the trailing electrode in dependence on the received synchronization signal before the guide electrode touches the workpiece.

2. The method according to claim 1, wherein the guide electrode touches the workpiece before the trailing electrode, an arc being ignited on the guide electrode when the workpiece is touched and an arc being ignited on the trailing electrode when the trailing electrode touches the workpiece or penetrates a region surrounding the guide electrode, which region is ionized by the arc of the guide electrode.

3. The method according to claim 1, wherein the trailing electrode touches the workpiece before the guide electrode, the control unit of the trailing electrode detecting a short circuit and sending a synchronization signal to the control unit of the guide electrode, the control unit of the guide electrode stopping welding-wire advancing of the guide electrode and the control unit of the trailing electrode stopping welding-wire advancing of the trailing electrode, wherein the control unit of the trailing electrode moves the trailing electrode to a certain electrode distance away from the workpiece and sends a synchronization signal to the control unit of the guide electrode, wherein the control unit of the guide electrode starts welding-wire advancing of the guide electrode and an arc is ignited on the guide electrode when the guide electrode touches the workpiece, the control unit of the guide electrode sending a synchronization signal to the control unit of the trailing electrode when the arc is ignited, and wherein the control unit of the trailing electrode starts welding-wire advancing of the trailing electrode in dependence on the received synchronization signal, an arc being ignited on the trailing electrode when the trailing electrode touches the workpiece or penetrates a surrounding region that is ionized by the arc of the guide electrode.

4. The method according to claim 1, wherein the trailing electrode touches the workpiece before the guide electrode, wherein the trailing electrode is defined as the guide electrode and the guide electrode is defined as the trailing electrode, wherein an arc is ignited on the guide electrode when the workpiece is touched and an arc is ignited on the trailing electrode when the trailing electrode touches the workpiece or penetrates a surrounding region that is ionized by the arc of the guide electrode.

5. The method according to claim 2, wherein the control unit of the guide electrode sends a synchronization signal to the control unit of the trailing electrode when the arc of the guide electrode is ignited, wherein the control unit of the trailing electrode stops welding-wire advancing when the synchronization signal is received and the trailing electrode is held in a waiting position for a certain waiting time and the control unit of the trailing electrode starts welding-wire advancing of the trailing electrode after the waiting time, the arc being ignited on the trailing electrode when the trailing electrode touches the workpiece or penetrates the region surrounding the guide electrode, which region is ionized by the arc of the guide electrode.

6. The method according to claim 1, wherein a pulse welding process, a welding process having reversing welding-wire advancing, a corona arc welding process or a short arc welding process is carried out as the welding process of the guide electrode and/or the trailing electrode.

7. The method according to claim 1, wherein the guide electrode and the trailing electrode are fed to a common weld pool on the workpiece.

8. The method according to claim 1, wherein a common control unit is provided for the control unit of the guide electrode and the control unit of the trailing electrode, which common control unit controls the welding process on the guide electrode and the welding process on the trailing electrode.

9. A welding arrangement for carrying out a multiple welding method on a workpiece having at least two welding devices for carrying out mutually independent welding processes, each welding device having a welding wire as a consumable electrode, a welding-wire advancing unit and a control unit for controlling the respective welding process, a welding wire being provided as a guide electrode and the at least one remaining welding wire being provided as a trailing electrode, wherein for performing a starting process of the multiple welding process, the control unit of the guide electrode is configured to control the welding-wire advancing unit of the welding device of the guide electrode in order to start welding-wire advancing of the guide electrode and to send a synchronization signal to the control unit of the trailing electrode when the guide electrode moves a specified distance or for a specified time and wherein the control unit of the trailing electrode is configured to control the welding-wire advancing unit of the welding device of the trailing electrode in order to start welding-wire advancing of the trailing electrode in dependence on the received synchronization signal before the guide electrode touches the workpiece.

10. The welding arrangement according to claim 9, wherein the control unit of the guide electrode is configured to ignite an arc at the guide electrode when the guide electrode touches the workpiece before the trailing electrode and wherein the control unit of the trailing electrode is configured to ignite an arc at the trailing electrode when the trailing electrode touches the workpiece or penetrates a surrounding region of the guide electrode, which region is ionized by the arc of the guide electrode.

11. The welding arrangement according to claim 9, wherein the control unit of the trailing electrode is configured to detect a short circuit and to send a synchronization signal to the control unit of the guide electrode when the trailing electrode touches the workpiece before the guide electrode, the control unit of the guide electrode being configured to control the welding-wire advancing unit of the welding device of the guide electrode when the synchronization signal is received in order to stop welding-wire advancing of the guide electrode and the control unit of the trailing electrode being provided to control the welding-wire advancing unit of the welding device of the trailing electrode in order to stop welding-wire advancing of the trailing electrode, wherein the control unit of the trailing electrode is configured to control the welding-wire advancing unit of the welding device of the trailing electrode in order to move the trailing electrode a certain electrode distance away from the workpiece and to send a synchronization signal to the control unit of the guide electrode, in that wherein the control unit of the guide electrode is configured to control the welding-wire advancing unit of the welding device of the guide electrode when the synchronization signal is received in order to start welding-wire advancing of the guide electrode and to ignite an arc at the guide electrode when the guide electrode touches the workpiece, the control unit of the guide electrode being configured to send a synchronization signal to the control unit of the trailing electrode when the arc is ignited, and wherein the control unit of the trailing electrode is configured to control the welding-wire advancing unit of the welding device of the trailing electrode in order to start welding-wire advancing of the trailing electrode in dependence on the received synchronization signal and ignite an arc on the trailing electrode when the trailing electrode touches the workpiece or penetrates a surrounding region of the guide electrode, which region is ionized by the arc of the guide electrode.

12. The welding arrangement according to claim 9, wherein when the trailing electrode touches the workpiece before the guide electrode, the control unit of the welding device of the trailing electrode is configured to define the welding wire of the welding device of the trailing electrode as the new guide electrode and to send a synchronization signal to the control unit of the welding device of the guide electrode, the control unit of the welding device of the guide electrode being configured to define the welding wire of the welding device as the new trailing electrode upon receipt of the synchronization signal, and in that wherein the control unit of the welding device of the new guide electrode is configured to ignite an arc at the new guide electrode when the welding wire of the new trailing electrode touches the workpiece and the control unit of the welding device of the new trailing electrode is configured to ignite an arc at the welding wire of the new trailing electrode when the new trailing electrode touches the workpiece or penetrates a surrounding region that has been ionized by the arc of the new guide electrode.

13. The welding arrangement according to claim 10, wherein the control unit of the guide electrode is configured to send a synchronization signal to the control unit of the trailing electrode when the arc of the guide electrode is ignited, the control unit of the trailing electrode being configured to control the welding-wire advancing unit of the welding device of the trailing electrode when the synchronization signal is received in order to stop the welding-wire advancing of the trailing electrode when the arc of the guide electrode is ignited, to start said welding-wire advancing again after a certain waiting time has elapsed and to ignite an arc on the trailing electrode when the trailing electrode touches the workpiece or penetrates the region surrounding the guide electrode, which region has been ionized by the arc of the guide electrode.

14. The welding arrangement according to claim 9, wherein a pulse welding process, a welding process having reversing welding-wire advancing, a corona arc welding process or a short arc welding process are provided as welding processes for the guide electrode and/or the trailing electrode.

15. The welding arrangement according to claim 9, wherein the guide electrode and the trailing electrode are positioned relative to one another in order to be fed by the welding-wire advancing units to a common weld pool on the workpiece.

16. The welding arrangement according to claim 9, characterized in that wherein the control unit of the guide electrode and the control unit of the trailing electrode are integrated into a common control unit.

* * * * *